United States Patent Office 3,397,178
Patented Aug. 13, 1968

3,397,178
HARDENABLE EPOXY RESIN COMPOSITIONS
William E. Shackelford and Warren J. Fullen, Kankakee, Ill., assignors to General Mills, Inc., a corporation of Delaware
No Drawing. Filed Oct. 13, 1966, Ser. No. 586,356
21 Claims. (Cl. 260—47)

The present invention relates to novel compositions comprising epoxy resins and certain derivatives of polyamines containing both primary and secondary amine groups. More particularly, it relates to hardenable compositions comprising epoxy resins and derivatives of organic isocyanates and secondary amine group containing polyamines in which the primary amine groups are blocked by ketimine or aldimine groups. It also relates to the infusible, insoluble resinous products prepared from such hardenable compositions.

Epoxy resins have been known and used commercially for some time, and these resins have been described in substantial detail in numerous publications and patents. For example, epoxy resins are described in substantial detail in such recently issued United States patents as Nos. 2,923,696, 3,026,285, 3,067,170, 3,072,606, 3,072,607, 3,073,799, 3,079,367, 3,080,341, and 3,084,139, each of which patents is included herein by reference as disclosing typical epoxy resins which are used in the practice of the instant invention.

Epoxy resins are known to produce a number of valuable products when reacted or cured with a variety of so-called curing agents. The properties of the resulting infusible, insoluble products depend not only on the particular epoxy resin employed but also on the curing agent used. Thus there has been a constant and continuing search for new epoxy resins and for new curing agents in order to provide hardenable compositions and infusible, insoluble products derived therefrom exhibiting improved properties.

Most of the known curing agents for epoxy resins leave something to be desired. Thus some of such materials react too rapidly and therefore have such a short "pot life" that the handling of the epoxy resin:curing agent system is considerably complicated. In the case of other curing agents, such compounds tend to cure the epoxy resins with objectionable results which include undesirably slow curing, low impact resistance in the cured resin and/or brittleness in the cured resin. The so-called "pot life" is important in that it represents the time that is allowed for the handling of the resin after the incorporation of the curing agent and before curing to such an extent that the resin can no longer be filmed, coated or otherwise manipulated in the manner desired prior to curing.

The chemistry of epoxy resins has been studied extensively. The epoxy resins contain the characteristic functional epoxy group, i.e.

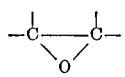

which characteristic functional group is understood to undergo the following cross-linking reactions when a primary amine group containing compound is used as a curing agent:

(1):
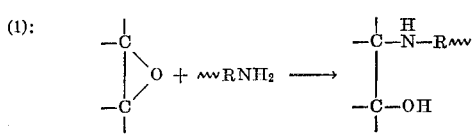

(2):
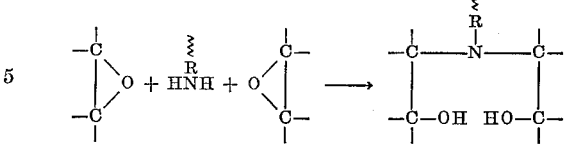

(3):
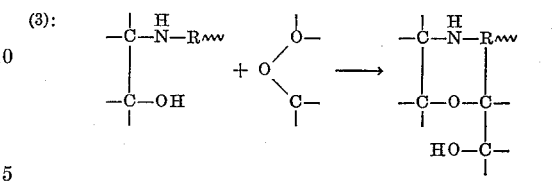

Under normal conditions, the two amine-epoxy reactions, i.e. (1) and (2), predominate and proceed at approximately equal rates. The use of simple polyamines containing primary amine groups, as cross-linking agents for the epoxy resins, ordinarily results in far too short a "pot life," among other undesirable results.

Prior workers in the art have suggested other cross-linking agents, as indicated in the previously mentioned patents, and specifically in U.S. Patent No. 3,026,285 mention is made of the use of a complex of a primary amine and an aldehyde. The reaction of a primary amine and a carbonyl compound, such as an aldehyde or ketone, is understood to proceed in accordance with the following equation:

(4):
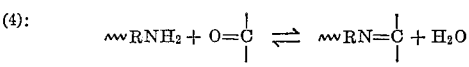

The foregoing reaction is, of course, reversible and the resulting complex will thus react in the presence of moisture to produce the primary amine again. The initial reaction to form the complex is carried out under conditions effecting the removal of water. Specific mention of such materials is also made in the aforesaid U.S. Patent No. 3,072,606, although the mention is made for use in connection with certain Friedel-Crafts catalysts.

Blocking of the primary amine groups of polyamines with ketimine or aldimine groups leads to curing agents yielding hardenable compositions with epoxy resins having an increased "pot life." However, if the starting polyamine has secondary amine groups, the pot life of the resulting hardenable composition may still be too short. In addition, the properties of the resulting infusible, insoluble product are substantially the same as obtained by the use of the polyamine per se.

It is an object of the present invention to provide novel hardenable compositions comprising epoxy resins and certain derivatives of polyamines containing both primary and secondary amine groups. Another object of our invention is to provide such hardenable compositions comprising epoxy resins and derivaties of organic isocyanates and secondary amine group containing polyamines in which the primary amine groups are blocked by ketimine or aldimine groups. A further object of the invention is to provide infusible, insoluble resinous products prepared from such hardenable compositions. These and other objects will become apparent from the following detailed description.

In general, the instant invention consists in new hardenable or curable compositions comprising an epoxy resin and a derivative of an organic isocyanate and a secondary amine group containing polyamine in which the primary amine groups are blocked by ketimine or aldimine groups. The present invention further consists in infusible, insoluble resinous products or polymers prepared from such hardenable compositions. Our new hardenable compositions have an extended pot life and yet can be cured in a relatively short period of time in the presence of moisture to yield infusible, insoluble resinous products having highly desirable properties. Our invention allows the tailoring of the properties of the cured products due to the introduction of groups derived from the organic isocyanates when the same are reacted with the ketimine or aldimine blocked polyamines containing at least one free secondary amine group. Certain of the hardenable compositions and the resulting cured resinous products of the present invention have properties which are equal in many respects, and superior in other respects, to the well-known epoxy resin-polyamide systems where the polyamide is derived from polymeric fat acids and polyamines. Thus certain of our compositions and products have an improved pot life when dissolved in dry or technical grade solvents, cure at lower temperatures, have improved solvent resistance and yet have other properties substantially equal to the properties of the known epoxy-polyamide systems referred to above. In addition, such compositions can unexpectedly be cured while immersed in water. Thus a thin film or layer of the composition, with or without solvents, pigments and the like, can be applied with a brush or the like to underwater surfaces and cured to yield hard, tough, continuous coatings.

The derivatives employed in combination with the epoxy resins in accordance with the present invention are prepared from organic isocyanates and ketimine or aldimine blocked polyamines which contain at least one free secondary amine group. Any polyamine capable of reacting with an organic isocyanate and having at least one secondary amine group may be used in the preparation of the derivatives. The preferred polyamines are the alkylene polyamines and the substituted alkylene polyamines. The preferred polyamines are selected from those having the following formula:

$$H_2N(RNH)_nRNH_2$$

where R is a difunctional aliphatic group containing from 2 to about 48 carbon atoms and $n$ is an integer of 1 to about 20. R may represent the same or different radicals in any one polyamine compound. Where the polyamines contain two or more secondary amine groups, one or more of said groups may have the hydrogen replaced by an aliphatic group, such as an aliphatic hydrocarbon group of 1 to about 24 carbon atoms—i.e. methyl, propyl, butyl, decyl, hexadecyl, hexenyl, octenyl, tridecenyl, octadecyl, undecenyl and the like. Inert or non-interfering groups such as Cl, nitro and the like may be present on the group R or the described substituent replacing the hydrogen of one or more secondary amine groups. The polyamines must contain at least one free secondary amine group,

prior to the preparation of the derivatives.

Especially preferred polyamines are those having the formula as set forth above wherein R is an aliphatic hydrocarbon group and $n$ is 1 to 3. It is still more preferred that R is an alkylene group of 2–6 carbon atoms.

Typical of the amines which may be used are diethylene triamine, triethylene tetramine, etc., and the corresponding propylene, butylene, etc. amine.

The primary amine groups in the polyamine compounds are converted to aldimines or ketimines by reaction with a carbonyl compound. Such carbonyl compound may have the following structural formula:

wherein $R_1$ and $R_2$ are hydrogen or organic radicals and are each substantially inert to the ketimine or aldimine formation reaction. At least one of such radicals must be an organic group. Preferably $R_1$ and $R_2$, when organic, are short chain alkyl groups (1 to 4 carbon atoms). Preferred compounds are low molecular weight ($C_2$–$C_6$) aldehydes or ketones that are volatile so that an unreacted excess thereof may easily be removed by conventional distillation practices when the reaction is completed. Such volatile compounds are also preferred so that when the derivatives are mixed with the epoxy resins and the resulting hardenable composition exposed to water—i.e., moisture, the freed aldehyde or ketone can be easily removed from the reaction mixture. It is often preferred to use a carbonyl compound which boils below or near the boiling point of water or which readily distills with water.

Preferred examples of the carbonyl compounds include such aldehydes and ketones as acetone, methylethyl ketone, diethyl ketone, methylpropyl ketone, methylisopropyl ketone, methylisobutyl ketone, methyl-n-butyl ketone, ethylisopropyl ketone, acetaldehyde, propionaldehyde, butyraldehyde, isobutyraldehyde, and the like. Especially preferred carbonyl compounds are acetone, methylethyl ketone and methylisobutyl ketone.

The derivatives employed in our invention are prepared from the polyamine compounds having at least one free secondary amine group and having the primary amine groups thereof blocked with ketimine or aldimine groups (i.e.

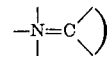

by reacting same with an organic isocyanate. Preferred isocyanates are the aliphatic, cycloaliphatic and araliphatic isocyanates.

Typical polyisocyanates which may be used in preparing the derivatives include the polymethylene diisocyanates such as ethylenediisocyanate, trimethylenediisocyanate, tetramethylenediisocyanate, pentamethylenediisocyanate, hexamethylenediisocyanate, etc.; other alkylene diisocyanates, such as propylene - 1,2 - diisocyanate, butylene - 1,2 - diisocyanate, butylene - 1,3 - diisocyanate, butylene - 2,3 - diisocyanate, etc.; alkylidene diisocyanate, such as ethylidene diisocyanate, butylidene diisocyanate, etc.; cycloalkylene diisocyanates, such as cyclopentylene-1,3 - diisocyanate, cyclohexylene-1,4-diisocyanate, 4,4'-diisocyanate bis(cyclohexyl)methane, etc.; cycloalkylidene diisocyanates, such as cyclopentylidene diisocyanate, cyclohexylidene diisocyanate, etc.; triisocyanates such as 1,2,4 - butanetriisocyanate, 1,3,3 - pentanetriisocyanate, 1,2,2-butanetriisocyanate, etc.

Examples of araliphatic polyisocyanates which may be used in the preparation of the derivatives include the following: p-phenylene-2,2'-bis(ethyl isocyanate), p-phenylene - 3,3' - bis(propyl isocyanate), p - phenylene-4,4'-bis-(butyl isocyanate), m-phenylene - 2,2' - bis(ethyl isocyanate), 1,4-naphthalene - 2,2' - bis(ethyl isocyanate), 4,4'-diphenylene-2,2'-bis(ethyl isocyanate), 4,4' - diphenylene ether-2,2'-bis(ethyl isocyanate), tris(2,2',2''-ethyl isocyanate benzene), 5-chloro phenylene-1,3-bis(propyl-3-isocyanate), 5 - methoxy phenylene-1,3-bis(propyl-3-isocyanate), 5-cyano phenylene-1,3-bis(propyl - 3 - isocyanate) and 5-methyl phenylene-1,3-bis(propyl-3-isocyanate).

Typical aromatic polyisocyanates which may be used include tolylene diisocyanate, m-phenylene diisocyanate, p-phenylene diisocyanate, 1-methyl-2,4-phenylene diisocyanate, naphthylene-1,4-diisocyanate, diphenylene-4,4'-diisocyanate, etc.; aliphatic-aromatic diisocyanates such as xylylene-1,4-diisocyanate, xylylene-1,3-diisocyanate, 4,4'-diphenylenemethane diisocyanate, etc.

A particularly desirable group of polyisocyanates to be employed in preparing the derivatives are those derived from polymeric fat acids. Such polyisocyanates have the following idealized structural formula:

$$[R'\!-\!\!(CH_2)_yNCO]_x$$

where $y$ is 0 or 1, $x$ is an integer of 2 to about 4 and R' is the hydrocarbon group of polymeric fat acids. Preferably, x is 2. The polyisocyanates of the above formula wherein y is 0 are prepared by converting the polymeric fact acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

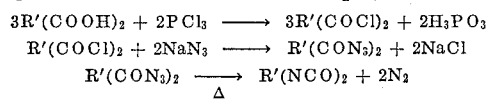

The polyisocyanates wherein y is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. This method of preparation can be conveniently illustrated by the following equations (using a dimeric fat acid as an example):

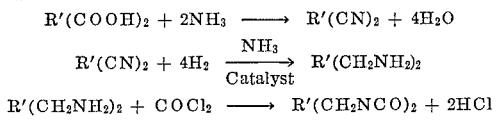

The polymeric fat acids, useful as the starting materials for preparing the above polyisocyanates, are prepared by polymerizing a fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The polyisocyanate derived from these dimeric fat radicals and trimeric fat radicals may be referred to hereinafter by the names dimeryl isocyanate and trimeryl isocyanate. These materials may be produced from mixtures of dimer and trimer fat acid and the relative quantities may be controlled by the degree to which the individual compounds have been isolated in preparing the dimer and trimer fat acids.

The polyisocyanates which may be used in the preparation of the derivatives can be in the form of the free isocyanate or they may be used in the form of so-called prepolymers. These prepolymers are reaction products of polybasic acids, polyols or polyester polyols with the polyisocyanate such that essentially 1 mole of polyisocyanate is reacted with each equivalent of carboxyl or hydroxy group, the product thus being an isocyanate terminated prepolymer. It is to be thus understood that the term "polyisocyanate" is intended to include the isocyanate terminated prepolymers of simple polyols, polybasic acids, polyether polyols, and polyester polyols. Typical polyols include trimethylolpropane, 1,4,6-hexanetriol, glycerol, ethylene glycol, diethylene glycol, 1,4-butanediol, 1,4- butenediol, 1,3-butanediol and the like. The polyether polyols are hydroxy terminated homopolymers and copolymers of ethylene oxide, propylene oxide, butylene oxide, and the like. The polyester polyols are hydroxyl terminated polymers which may be derived from the above polyols and any of the typical polybasic acids used for the preparation of polyesters may be used.

Mono-isocyanates may also be employed in preparing the derivatives. Such isocyanates may be aliphatic, cycloaliphatic, aromatic, araliphatic and the like. Representative of such isocyanates are the following: decylisocyanate, hexadecylisocyanate, heptadecylisocyanate, heneicosylisocyanate, octadecylisocyanate, docosylisocyanate, 18-pentatricontane isocyanate, naphthenic isocyanate derived from bicyclic naphthenic acid—i.e. $C_{20}H_{37}COOH$, 1-stearyl-oxy-phenylene-4-isocyanate, 4-carbooctadecoxy tetrahydrophenyl isocyanate, n-dodecyl isocyanate, 9-octadecenyl isocyanate, cetyl isocyanate, cholesterol adipic acid ester isocyanate, octadecyl oxy acetic acid isocyanate, dodecyl mercaptan acetic acid isocyanate, stearyl glycolic isocyanate, stearyl amino acetic acid isocyanate, urethane N-acetic acid isocyanate, hexadecyl oxy-phenyl isocyanate, octadecyl mercapto-propiono isocyanate, octadecyl mercapto-acetic acid isocyanate, lenulinic dioctadecyl mercaptol isocyanate, and the like.

Preferred organic isocyanates to be employed in preparing the derivatives are the isocyanates having hydrocarbon radicals. Between the mono- and polyisocyanates, it is preferred to employ the latter. Particularly preferred compounds are the diisocyanates. Of this class the dimeryl diisocyanates are preferred reactants. Mixtures of the various organic isocyanates may be employed.

The derivatives used in the present invention are prepared by simply mixing the ketimine or aldimine blocked polyamine with the organic isocyanate. Such mixing is preferably carried out in an atmosphere free of moisture. Where desired, the reaction mixture may be heated although the reaction is normally exothermic to a certain extent. The organic isocyanate is used in an amount about equivalent to the equivalents of free secondary amine groups of the polyamine. In this respect, if the polyamine contains one free secondary amine group and the isocyanate is a monoisocyanate, one mole of the polyamine is reacted with one mole of the isocyanate. If the polyamine contains two free secondary amine groups and the isocyanate is a monoisocyanate, one mole of the polyamine would be reacted with two moles of the isocyanate. If the polyamine has one free secondary amine group and the isocyanate is a diisocyanate, two moles of the polyamine would be reacted with one mole of the diisocyanate. It is thus apparent that the ratio of reactants varies as the number of free secondary amine groups of the polyamine —i.e. one, two, three or more—and as to whether the isocyanate is mono, di, tri or higher. The derivative may be prepared in the presence of a solvent or diluent if desired. The reaction of the secondard amine group or groups (i.e. >NH) of the polyamine with the isocyanato group (i.e. —NCO) yields a linkage of the following structure:

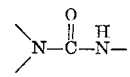

The derivatives used in the present invention are complex materials. In this respect they comprise a residue of a polyamine, 2 or more (preferably less than about 50) ketimine or aldimine blocked primary amine groups and 1 or more (preferably less than about 50) urea groups derived from the secondary amine group or groups of the polyamine and the isocyanate compounds. In some of the preferred and simpler aspects, the derivatives can be defined structurally. Thus, when the polyamine has only one free secondary amine group and the isocyanate is mono- or di-functional or when the polyamine has more than one free secondary amine group and the isocyanate is monofunctional, the derivatives can be defined by the following idealized, structural formulae:

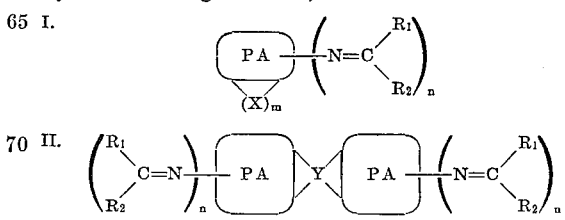

where $R_1$ and $R_2$ are as defined above, n is an integer of at least 2, m is an integer of at least 1, is the residue of a polyamine exclusive of the ketimine blocked primary amine groups and the urea linked secondary amine nitrogen,

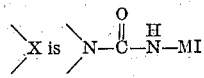
X is $\rangle N-\overset{O}{\overset{\|}{C}}-\overset{H}{N}-MI$ where MI is the residue of a monoisocyanate, and $\rangle Y\langle$ is

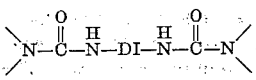
$\rangle N-\overset{O}{\overset{\|}{C}}-\overset{H}{N}-DI-\overset{H}{N}-\overset{O}{\overset{\|}{C}}-N\langle$ where DI is the residue of a diisocyanate. Where the polyamine contains two or more secondary amine groups and the isocyanate is di, tri or higher functional, complex mixtures of derivatives tend to be produced. Such mixtures include polymers where three or more polyamine moieties are linked by three or more isocyanate moieties. The derivatives used in the present invention also include mixtures wherein two or more different polyamines are employed and/or two or more different isocyanates are employed.

The following examples serve to illustrate the preparation of the derivatives but are not to be considered limitations thereof.

Example A

Forty seven parts by weight of the diketimine made from diethylene triamine and methyl isobutyl ketone were mixed with 53 parts by weight of dimeryl isocyanate (molar ratio of 2:1). The dimeryl isocyanate had the theoretical structural formula $$D(CH_2NCO)_2$$

where D is the dimeric fat acid radical and in this case was derived from the mixture of dimerized fat acids obtained from the fat acids in tall oil consisting mainly of a mixture of dimerized linoleic and oleic acids. The resulting derivative had the following idealized structural formula:

Example B

Example A was repeated except that 188 parts by weight of the diketimine made from diethylene triamine and methyl isobutyl ketone were blended with 172 parts by weight of methyl isobutyl ketone and then reacted with 212 parts by weight of the dimeryl isocyanate. The reaction flask was placed in an ice bath and the dimeryl isocyanate was added slowly with stirring to limit the temperature to 26° C. maximum. The derivative had the same structure as the derivative of Example A.

Example C

Into a one liter round bottom flask fitted with a stirrer, thermometer, and dropping funnel was charged 267 g. of diketimine as used in Example A. The reaction flask was flushed with nitrogen and then 87 g. toluene diisocyanate (Nacconate 80) dissolved in 200 ml. toluene was slowly added over a one hour period. The reaction temperature was maintained below 30° C. with an ice water bath. Stirring was continued for ¾ hour after completing the addition of the diisocyanate. Toluene was then stripped from the reaction product under reduced pressure. There was obtained 346.6 g. of derivative, said derivative consisting essentially of a 80:20 mixture, respectively, of isomers of the structure:

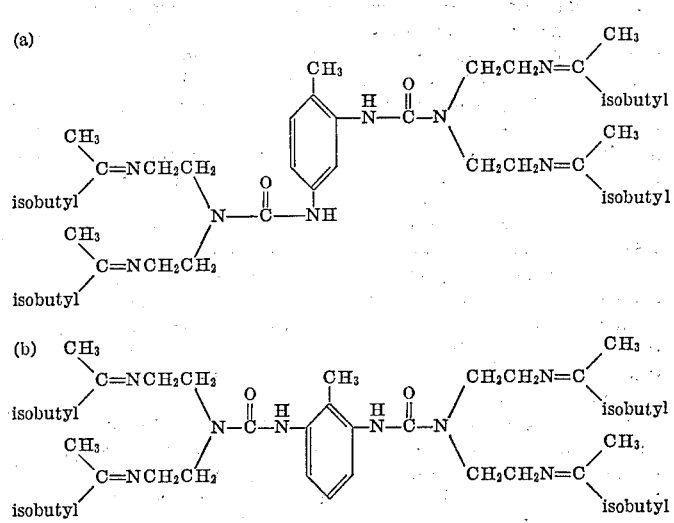

As set forth above the hardenable compositions comprise the described derivative and an epoxy resin. Any epoxy resin can be used in the practice of the present invention. Suitable resins include the reaction products of polyhydric phenols with polyfunctional halohydrins. Typical polyhydric phenols useful in the preparation of such resins include resorcinol and various bisphenols resulting from the condensation of phenol with aldehydes and ketones such as formaldehyde, acetaldehyde, acetone, methyl ethyl ketone, and the like. A typical epoxy resin of this type is the reaction product of epichlorohydrin

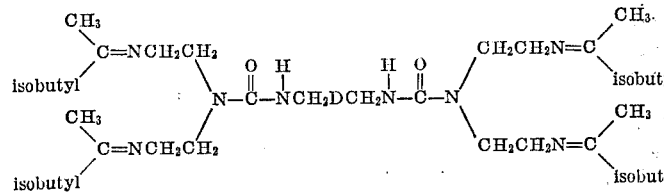

and 2,2-bis(p-hydroxyphenyl)propane (Bisphenol A), the resin having the following theoretical structural formula:

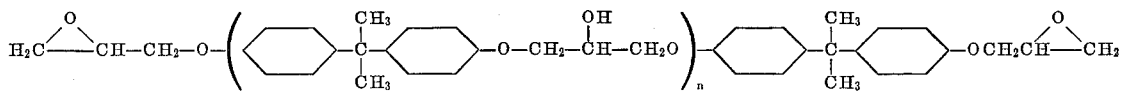

where $n$ is 0 or an integer up to 10. Generally speaking, $n$ will usually be no greater than 3 or 4, and may be 1 or less. However, other types of epoxy resins may be employed.

Another of such epoxy resins are those which are the reaction product of epichlorohydrin and bis(p-hydroxyphenyl) sulfone. Still another group of epoxy compounds which may be employed are the glycidyl esters of polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical, idealized formula:

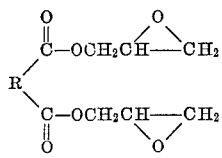

where R is the divalent hydrocarbon radical of dimerized unsaturated fatty acids.

Other types of epoxy resins which may be used with the derivatives in accordance with the present invention and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha, alpha, omega, omega-tetrakis (hydroxyphenyl) alkanes, such as 1,1,2,2-tetrakis (hydroxyphenyl) ethane, 1,1,4,4-tetrakis (hydroxyphenyl) butane, 1,1,4,4-tetrakis (hydroxyphenyl)-2-ethylbutane and the like. The epoxy resin reaction product of epichlorohydrin and tetraphenol may be represented by the following theoretical structural formula:

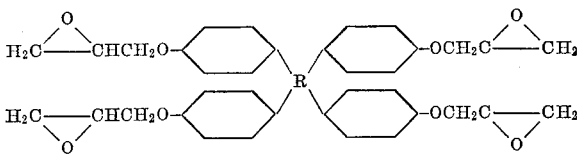

where R is a tetravalent aliphatic hydrocarbon chain having from 2 to 10, and preferably, from 2 to 6 carbon atoms.

Still another group of epoxide materials are the epoxidized novolac resins. Such resins are well-known substances and readily available commercially. The resins may be represented by the following theoretical, idealized formula:

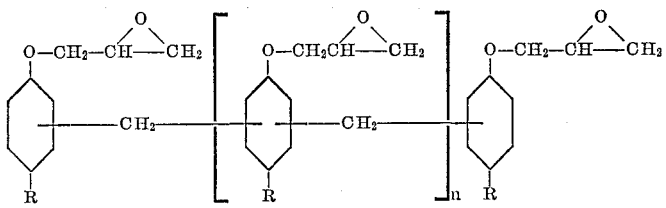

where R is selected from the group consisting of hydrogen and alkyl groups having up to 18 carbon atoms, and $n$ is an integer of from 1 to 10. Generally, $n$ will be an integer in excess of 1 to about 5.

In general, these resins are obtained by epoxidation of the well-known novolac resins. The novolac resins, as is known in the art, are produced by condensing the phenol with an aldehyde in the presence of an acid catalyst. Although novolac resins from other aldehydes such as, for example, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be linked to the para carbon atom of the parent phenolic nucleus. However, novolac resins in which the alkyl group is in the ortho position have been prepared.

The epoxidized novolac resin is formed in the well-known manner by adding the novolac resins to the epichlorohydrin and then adding an alkali metal hydroxide to the mixture so as to effect the desired condensation reaction.

In addition, other epoxy resins which may be used in the hardenable compositions of the present invention are epoxidized olefins, such as epoxidized polybutadiene and epoxidized cyclohexenes, and the diglycidyl ethers of the polyalkylene glycols. These latter ethers are readily available commercially and may be represented by the following theoretical, idealized formula:

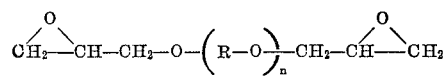

where R is an alkylene radical having from 2–5 carbon atoms and $n$ is an integer of from about 1 to about 50. R is preferably ethylene or propylene or mixtures thereof and $n$ is preferably about 3 to about 10. It is understood that $n$ represents an average figure since the ethers are often prepared from a mixture of glycols—i.e., tripropylene glycol, tetrapropylene glycol, and the like. Said epoxy resins may be prepared in the manner set forth in U.S. Patent 2,923,696.

In general, the epoxy resins may be described as those having terminal epoxide groups, or at least as having more than one epoxide group per molecule, i.e., a plurality of 1,2-epoxide groups.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights of from about 140 to about 2000.

The described polyamine derivatives are used in an amount sufficient to cure the epoxy resin to an insoluble and infusible polymer. Ideally the amount of the polyamine derivative curing agent would be sufficient to provide about one primary amino group for two epoxy groups in the resin, in accordance with the general theory that the cross-linking reaction proceeds predominantly through the primary amine group. In actual practice, however, such factors as steric hindrance, self cross-linking of the epoxy and the like preclude reaction of every epoxy group and every primary amine group in many cases. The weight ratios preferred for use in the practice of the instant invention on the basis of (1) epoxy resin to (2) polyamine derivative may range from about 95:5 to 50:50. It will be understood that the relative proportions of (1):(2) relate to the hardenable components of the composition and suitable conventional additives such as pigments, fillers, flow control agents, accelerators, solvents and the like may be incorporated in the compositions.

The infusible, insoluble resinous compositions of our invention are prepared from the described hardenable compositions by exposing the same to moisture. The curing rate can be increased or decreased by varying the temperature and/or relative humidity. Water may be added to the hardenable composition to give quicker activation. The hardenable compositions are preferably exposed to atmospheres containing relative humidities of 25 to 90%. Curing temperatures of 25–450° F. are preferred.

It is understood that the atmospheric moisture or water hydrolyzes or unblocks the ketimine or aldimine blocked primary amine groups of the derivatives. The freed primary amine groups thus enter into the reaction with the epoxy resin. In the complete absence of moisture, the hardenable compositions are, accordingly, stable for long periods of time. As a further but less preferred variation of our invention, the organic isocyanate derivative of the ketimine or aldimine blocked polyamines may first be hydrolyzed and then mixed with the epoxy resin. In such embodiment, the pot life is short but the resulting infusible, insoluble resinous product will still show the properties introduced by the isocyanate moiety. Thus where pot life is not of importance, our invention also includes hardenable compositions comprising an epoxy resin and a hydrolyzed derivative of a polyamine wherein the secondary amine groups have been reacted with organic isocyanates.

The following examples illustrate certain preferred embodiments of the invention and are not to be considered as limiting. All parts are by weight unless otherwise indicated.

Examples I–VI

The derivative as prepared in Example A, an epoxy resin and a solvent were blended to yield a series of hardenable compositions. The epoxy resin was a glycidyl ether having an epoxy equivalent weight of about 525 prepared by condensing bisphenol A and epichlorohydrin. The solvent consisted of methyl isobutyl ketone and xylol (1:1 volume ratio). The curable compositions were formulated as shown in the following Table I (parts by weight):

TABLE I

| | Derivative | Epoxy Resin [1] | Solvent |
|---|---|---|---|
| Example I | 10.0 | 50.0 | 20.0 |
| Example II | 9.0 | 51.6 | 19.2 |
| Example III | 8.0 | 53.2 | 18.4 |
| Example IV | 7.0 | 55.0 | 17.8 |
| Example V | 6.0 | 56.8 | 17.2 |
| Example VI | 5.0 | 65.0 | 10.0 |

[1] A 60% by weight solution of the epoxy resin in methyl isobutyl ketone and xylol (1:1 volume ratio).

These compositions were then tested for pot life (viscosity increase at 73° F. and in an atmosphere substantially free from moisture). Coatings were also prepared from the said compositions and tested for hardness, extensibility, and solvent resistance. The results of these tests are set forth in the following Tables II–V:

TABLE II

| Composition | Viscosity (Gardner Holdt) | |
|---|---|---|
| | After 1 day | After 7 days |
| Example I | D+ | M |
| Example II | D+ | M |
| Example III | D+ | N |
| Example IV | D+ | N |
| Example V | D+ | J+ |
| Example VI | D | I |

TABLE III

| Composition | Film Hardness (Sward), 1.5 Mil Films on Glass, Cured at 73° F. and 50% Relative Humidity | |
|---|---|---|
| | 1 day | 7 days |
| Example I | 36 | 52 |
| Example II | 34 | 53 |
| Example III | 31 | 53 |
| Example IV | 31 | 54 |
| Example V | 29 | 52 |
| Example VI | Not tested | Not tested |

TABLE IV

| Composition | Extensibility (G.E. Tester), 1.5 Mil Films On Tinplate, Cured at 73° F. and 50% Relative Humidity | |
|---|---|---|
| | 1 day | 7 days [1] |
| Example I | 60+ | |
| Example II | 60+ | |
| Example III | 60+ | |
| Example IV | 10–20 | 60+ |
| Example V | 1–2 | 60+ |
| Example VI | Not tested | Not tested |

[1] Not tested at 7 days where 60+ achieved after 1 day.

TABLE V

| Composition | Solvent Resistance,[1] 1.5 Mil Films On Tinplate and Glass, Cured at 73° F. and 50% Relative Humidity for 7 days | | | | | | |
|---|---|---|---|---|---|---|---|
| | 37% $H_2SO_4$ | 20% NaOH | Oleic Acid | Water | Mineral Spirits | Aviation Gas | 5% Acetic Acid |
| Example I | H | H | H | H | H | H | H |
| Example II | H | H | H | H | H | H | S |
| Example III | H | H | H | H | H | H | S |
| Example IV | H | H | H | H | H | H | S |
| Example V | H | H | H | S | H | H | S |
| Example VI | H | H | S | SS | SS | S | S |

[1] Solvent resistance was measured by immersing the coated substrate in the designated solvent for about 18 hours and then examining the coatings to see whether they remained hard (H), were slightly softened (SS) or were soft (S). The acid tests were carried out on the coated glass; the remaining tests on the coated tinplate.

The data of the above examples show that the hardenable compositions of the present invention have a desirably long pot life and yet will cure in relatively short periods of time at ambient temperatures and in the presence of moisture to yield coatings which are tough, hard, flexible and have good solvent resistance to many of the commonly encountered solvents. The coatings of Examples I–III became tack free after 270 minutes. The coatings of Examples IV and V became tack free after 330 and 350 minutes, respectively. The tack free time for the coatings prepared from the composition of Example VI were not measured.

Examples VII and VIII

Hardenable compositions were prepared by mixing 25 parts by weight of the epoxy resin as used in Examples I–VI, 5.0 parts by weight of a solvent consisting of a mixture of methyl isobutyl ketone and xylol (1:1 volume ratio) and 7.5 (Example VII) or 10.0 (Example VIII) parts by weight of the derivative of Example C. These compositions were then tested essentially as the compositions of Examples I–VI were tested. The results are set forth in the following tables:

TABLE VI

| Composition | Viscosity (Gardner Holdt) | |
|---|---|---|
| | After 1 day | After 4 days |
| Example VII | F | X |
| Example VIII | F+ | Y |

TABLE VII

| Composition | Film Hardness, 1.5 Mil Films On Glass, Cured at 73° F. and 50% Relative Humidity After 7 days |
|---|---|
| Example VII | 54 |
| Example VIII | 57 |

TABLE VIII

| Composition | Extensibility (G.E. Tester), 1.5 Mil Films On Tinplate, Cured at 73° F. and 50% Relative Humidity | |
|---|---|---|
| | 1 day | 4 days |
| Example VII | 60+ | 60+ |
| Example VIII | 60+ | 60+ |

TABLE IX

| Composition | Solvent Resistance,[1] 1.5 Mil Films On Tinplate and Glass, Cured at 73° F. and 50% Relative Humidity for 7 Days | | | | | | |
|---|---|---|---|---|---|---|---|
| | 37% $H_2SO_4$ | 20% NaOH | Oleic Acid | Water | Mineral Spirits | Aviation Gas | 5% Acetic Acid |
| Example VII | H | H | H | H | H | H | S |
| Example VIII | H | H | H | H | H | H | S |

[1] See footnote 1 at end of Table V.

Example IX

A hardenable composition was prepared from 25 parts by weight of the derivative as prepared in Example A and 75 parts of epoxy resin as used in Examples I–VI. Such composition was compared in various tests to a curable composition prepared by mixing 35 parts by weight of Versamid 115 and 65 parts by weight of the epoxy resin (same as used in Examples I–VI). The results of various tests on these two compositions are set forth in the following Table X:

TABLE X

| | Hardenable Composition of the present Invention | Curable Composition Using Versamid 115 |
|---|---|---|
| Pot Life,[1] Technical Grade Solvents | 8–12 days | 2–3 days. |
| Pot Life,[1] Dry Solvents | 20–30 days | 2–3 days. |
| Tack-free Time [2] | 2½ hrs | 2½ hrs. |
| Cure Time [3] at 75° F | 1 day | 1–2 days. |
| Cure Time [3] at 40° F | 2–5 days | Incomplete. |
| Sward Hardness, 7 Day Cure at 75° F. and 50% Relative Humidity | 55 | 58. |
| G.E. Extensibility, 7 Day Cure at 75° F. and 50% Relative Humidity | >60% | >60%. |
| Solvent Resistance,[4] 7 Day Cure at 75° F. and 50% Relative Humidity: | | |
| 37% $H_2SO_4$ | H | H. |
| 20% NaOH | H | H. |
| Water | H | H. |
| Mineral Spirits | H | H. |
| Aviation Gas | H | H. |
| Skydrol 500 Hydraulic Fluid | H | S. |
| Oleic Acid | H | S. |
| 5% Acetic Acid | S | S. |

[1] Time lapse before an insoluble, infusible polymer formed in atmosphere free of moisture and at 75° F.
[2] 1.5 mil film at 75° F. and 50% relative humidity. Films in remainin tests were also 1.5 mils in thickness.
[3] Cure time of 1.5 mil film at indicated temperature and 50% relati humidity representing point at which insoluble, infusible polym r formed.
[4] See footnote 1 at end of Table V.

Example X

The following two compositions were prepared by blending the respective components:

Composition a

| Component: | Grams |
|---|---|
| Derivative (as prepared in Example A) | 84 |
| $TiO_2$ (Rutile) | 285 |
| Methyl isobutyl ketone | 30 |
| Xylene | 131 |
| Solvesso 100 | 60 |
| | 590 |

Composition b

| Component: | Grams |
|---|---|
| Epoxy resin (as used in Examples I–VI—dissolved as 75% solids in 35:65 volume ratio of xylene and methyl isobutyl ketone) | 333 |
| Methyl isobutyl ketone | 12 |
| Ethylene glycol monoethyl ether | 75 |
| Urea-formaldehyde resin (60% in butanol) | 10 |
| | 430 |

The two compositions a and b were combined on an equal volume basis and applied as a 2–5 mil film on steel panels completely immersed in cold tap water. The formulation cured to yield a hard, tough, continuous coating on the immersed panels.

The formulation of this example has a pot life of from 1 to 3 weeks and longer in the absence of moisture or water. When water is admixed therewith, the composition becomes pseudo-plastic and provides coatings having a high degree of sag resistance. The pot life of this latter water containing formulation is approximately one day. The pigments, solvents, and solids content of the formulation can be selected to provide the optimum spreading consistency for any desired application.

Example XI

Forty-five parts of the derivative as prepared in Example A were blended with 55 parts of an epoxy resin which was a glycidyl ether having an epoxy equivalent weight of about 185 prepared by condensing Bisphenol A and epichlorohydrin. This hardenable composition was placed in a closed container for 18 hours. When the composition was spread on glass and exposed to an atmosphere containing 60% relative humidity (80° F.), a hard clear film was formed when the coating was inspected after 16 hours.

It is evident from the above data that the present invention is capable of providing hardenable compositions which have a longer pot life than certain well-known epoxy-curing agent systems and yet cure as fast under ambient room temperature conditions and faster under reduced temperatures. The resulting infusible, insoluble polymers have increased solvent resistance. Other hardenable compositions of the invention provide other advantages. Thus the properties of the cured resin systems can be tailored by selection of the particular polyamine and isocyanate moiety introduced into the derivative. Our compositions are useful in the preparation of coatings, adhesives, laminates, castings and the like.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. A hardenable composition comprising a mixture of (1) an epoxy resin having a plurality of 1,2-epoxide groups and (2) a derivative of an organic isocyanate and a polyamine having at least one free secondary amine group and at least two primary amine groups, the said primary amine groups being blocked by aldimine or ketimine groups, said derivative having been prepared by reacting about equivalent amounts of the polyamine with the isocyanate, the equivalents being based on the free secondary amine groups of the polyamine and the isocyanato groups of the isocyanate.

2. The composition of claim 1 wherein the epoxy resin is a glycidyl ether of a polyhydric phenol.

3. The composition of claim 1 wherein the epoxy resin has an epoxy equivalent weight of from about 140 to about 2000.

4. The ocmposition of claim 1 wherein the polyamine is an alkylene polyamine having two primary amine groups, the said primary amine groups being blocked by aldimine or ketimine groups.

5. The composition of claim 4 wherein the alkylene group of the polyamine contains 2 to about 6 carbon atoms.

6. The composition of claim 5 wherein the alkylene polyamine contains one free secondary amine group.

7. The composition of claim 1 wherein the organic isocyanate is an aliphatic isocyanate.

8. The composition of claim 1 wherein the organic isocyanate is a diisocyanate.

9. The composition of claim 1 wherein the organic isocyanate has the formula $$[R'+(CH_2)_yNCO]_x$$

where $y$ is 0 or 1, $x$ is an integer of 2 to about 4 and R is the hydrocarbon group of polymeric fat acids.

10. The composition of claim 9 wherein $y$ is 1 and $x$ is 2.

11. The composition of claim 1 wherein the derivative has the formula $$\left(\underset{(X)_m}{\boxed{PA}}\!\!-\!\!N=C\!\!<\!\!\begin{array}{c}R_1\\R_2\end{array}\right)_n$$

where $R_1$ and $R_2$ are hydrogen or organic radicals with the proviso that one of said radicals must be an organic radical, $n$ is an integer of at least 2, $>Y<$ is least 1, $>X$ is $$>\!\!N\!\!-\!\!\overset{O}{\underset{\|}{C}}\!\!-\!\!\overset{H}{\underset{|}{N}}\!\!-\!\!MI$$

where MI is the residue of an organic monoisocyanate, and $$\boxed{PA}$$

is the residue of a polyamine exclusive of the ketimine or aldimine blocked primary amine groups and the urea linked secondary amine nitrogen.

12. The composition of claim 1 wherein the derivative has the formula $$\left(\!\!\begin{array}{c}R_1\\R_2\end{array}\!\!>\!\!C=N\!\!-\!\!\right)_n\!\!\boxed{PA}\!\!>\!\!Y\!\!<\!\!\boxed{PA}\!\!-\!\!\left(\!\!N=C\!\!<\!\!\begin{array}{c}R_1\\R_2\end{array}\!\!\right)_n$$

where $R_1$ and $R_2$ are hydrogen or organic radicals with the proviso that one of said radicals must be an organic radical, $n$ is an integer of at least 2, $>Y<$ is $$>\!\!N\!\!-\!\!\overset{O}{\underset{\|}{C}}\!\!-\!\!\overset{H}{\underset{|}{N}}\!\!-\!\!DI\!\!-\!\!\overset{H}{\underset{|}{N}}\!\!-\!\!\overset{O}{\underset{\|}{C}}\!\!-\!\!N\!\!<$$

where DI is the residue of an organic diisocyanate and $$\boxed{PA}$$

is the residue of a polyamine exclusive of the ketimine or aldimine blocked primary amine groups and the urea linked secondary amine nitrogen.

13. The composition of claim 1 wherein the epoxy resin is a glycidyl ether of 2,2-bis(p-hydroxyphenyl) propane having an epoxy equivalent weight of about 525 and the derivative has the formula where D is the divalent hydrocarbon radical of a mixture of dimerized linoleic and oleic acids, said derivative being used in an amount sufficient to cure the epoxy resin to an infusible, insoluble polymer.

14. The composition of claim 1 wherein the epoxy resin is a glycidyl ether of 2,2-bis(p-hydroxyphenyl) propane having an epoxy equivalent weight of about 525 and the derivative is a mixture of isomers of the formulae

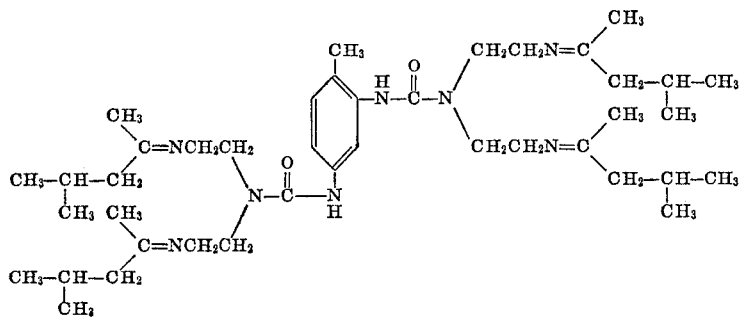

and

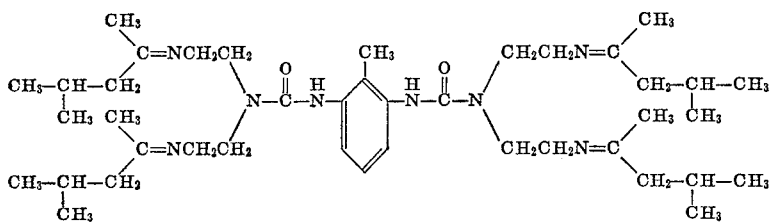

said derivative being used in an amount sufficient to cure the epoxy resin to an infusible and insoluble polymer.

15. A hardenable composition comprising a mixture of (1) an epoxy resin having a plurality of 1,2-epoxide groups and (2) the product obtained by the hydrolysis of a derivative of an organic isocyanate and a polyamine having at least one free secondary amine group and at least two primary amine groups, the said primary amine groups being blocked by aldimine or ketimine groups, said derivative having been prepared by reacting about equivalent amounts of the polyamine with the isocyanate, the equivalents being based on the free secondary amine groups of the polyamine and the isocyanato groups of the isocyanate.

16. The composition of claim 15 wherein the product has the formula

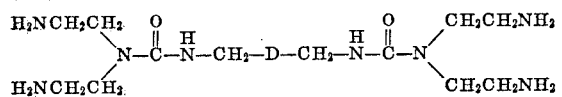

where D is the divalent hydrocarbon radical of a mixture of dimerized linoleic and oleic acids.

17. An infusible, insoluble resinous product formed by curing the composition of claim 1 in the presence of moisture.

18. An infusible insoluble resinous product formed by the curing the composition of claim 11 in the presence of moisture.

19. An infusible, insoluble resinous product formed by curing the composition of claim 12 in the presence of moisture.

20. An infusible, insoluble resinous product formed by curing the composition of claim 13 in the presence of moisture.

21. An infusible, insoluble resinous product formed by curing the composition of claim 14 in the presence of moisture.

References Cited

UNITED STATES PATENTS 3,322,797  5/1967  Holm.

WILLIAM H. SHORT, *Primary Examiner.*

T. D. KERWIN, *Assistant Examiner.*